(12) United States Patent
Tkachev et al.

(10) Patent No.: US 7,567,981 B2
(45) Date of Patent: Jul. 28, 2009

(54) STORAGE MEDIUM (75) Inventors: Pavel Tkachev, Kyiv (UA); Alexander Sinitsky, Kyiv (UA)

(73) Assignee: Uvarta, Inc., Mountain View, CA (US)

( * ) Notice: Subject to any disclaimer, the term of this patent is extended or adjusted under 35 U.S.C. 154(b) by 561 days.

(21) Appl. No.: 11/102,568

(22) Filed: Apr. 8, 2005

(65) Prior Publication Data

US 2006/0047654 A1    Mar. 2, 2006

Related U.S. Application Data

(63) Continuation-in-part of application No. 11/030,613, filed on Jan. 6, 2005, now abandoned.

(60) Provisional application No. 60/606,686, filed on Sep. 2, 2004, provisional application No. 60/534,941, filed on Jan. 8, 2004.

(51) Int. Cl.
*G06F 17/30* (2006.01)

(52) U.S. Cl. .................................................. 707/104.1

(58) Field of Classification Search ............... 707/7–10, 707/104.1, 203, 205; 711/209; 345/568
See application file for complete search history.

(56) References Cited

U.S. PATENT DOCUMENTS

| | | | |
|---|---|---|---|
| 2001/0021965 A1* | 9/2001 | Yokota et al. | 711/163 |
| 2002/0174145 A1* | 11/2002 | Duga et al. | 707/513 |
| 2005/0094805 A1* | 5/2005 | Kitani et al. | 380/28 |
| 2006/0044979 A1* | 3/2006 | Kuraoka et al. | 369/53.17 |
| 2006/0087943 A1* | 4/2006 | Kuraoka et al. | 369/53.2 |
| 2007/0276882 A1* | 11/2007 | Nishimura et al. | 707/203 |

* cited by examiner

*Primary Examiner*—Diane Mizrahi
(74) *Attorney, Agent, or Firm*—Townsend and Townsend and Crew LLP (57) ABSTRACT

A novel storage medium is disclosed, along with methods for use and recording of such novel storage medium, as well as apparatus for using and recording such novel storage medium. The novel storage medium allows data stored on an original disk to be properly accessed. The same data stored in an unoriginal storage media may not be properly accessed.

17 Claims, 5 Drawing Sheets

| Block Description | Logical Address (Decimal) | Absolute MFS Address[a] (Hex) | Track and Index | Sector is Info or is Pause | Mode Audio or Data | CD-ROM Data Mode[b] |
|---|---|---|---|---|---|---|
| Lead-in area[c] | --- | --- | 0/- | --- | Audio | --- |
| Pre-gap[c] | --- | 00/00/00 | 1/0 | Pause | Data | Null |
| 1st Track data | 0000[d] | 00/02/00[e] | 1/1 | Info | Data | L-EC |
| 2nd Track data | 6000[d] | 01/16/00[e] | 2/1 | Info | Data | L-EC |
| | 7500 | 01/2A/00 | 2/2 | Info | Data | L-EC |
| Post-gap | 9000 | 02/02/00 | 2/3 | Pause | Data | Null |
| Pause-silence | 9150 | 02/04/00 | 3/0 | Pause | Audio | --- |
| 3rd Track audio | 9300 | 02/06/00 | 3/1 | Info | Audio | --- |
| | 11400 | 02/22/00 | 3/2 | Info | Audio | --- |
| 4th Track audio | 21825 | 04/35/00 | 4/1 | Info | Audio | --- |
| Pre-gap part 1 | 30000 | 06/2A/00 | 5/0 | Pause | Audio | --- |
| Pre-gap part 2 | 30075 | 06/2B/00 | 5/0 | Pause | Data | Null |
| 5th Track data | 30225 | 06/2D/00 | 5/1 | Info | Data | L-EC |
| Last information | 263999 | 3A/29/4A | 5/1 | Info | Data | L-EC |
| Post-gap | 264000 | 3A/2A/00 | 5/2 | Pause | Data | Null |
| Lead-out Track | 264150 | 3A/2C/00[f] | AA/0 | Pause | Audio | --- |

Notes to Table:

a. Absolute MSF address repeated in the header field of data blocks.

b. The CD-ROM data mode is stored in the header of data Tracks. This indicates that the block is part of a data pre-gap or post-gap (null), that this is a data block using the auxiliary field for L-EC symbols (ECC - CD-ROM data mode one), or that this is a data block using the auxiliary field for user data (CD-ROM data mode two).

c. Table of contents information is stored in the sub-channel of lead-in area. The lead-in area is coded as Track zero. Track zero and the initial 150 sector pre-gap (or audio pause) are not accessible with logical addressing.

d. Exact value returned by READ TOC/PMA/ATIP Command.

e. Value stored in Table of Contents with zero tolerance.

f. Value stored in Table of Contents: exact, if lead-out Track is coded as data, or plus or minus 75 blocks if coded as audio.

Table 1

STORAGE MEDIUM

CROSS-REFERENCES TO RELATED APPLICATIONS

This application is a continuation-in-part of U.S. Ser. No. 11/030,613 filed Jan. 6, 2005 and incorporates that application for all purposes.

BACKGROUND OF THE INVENTION

The present invention relates to computer-readable media, such as computer disks. More specifically, the present invention relates to methods and apparatus for reducing use of data stored on non-original media.

Optical storage media has become the format of choice for publishers and developers of software programs, such as consumer entertainment programs, educational programs, reference and business application programs, movies, and the like. Additionally such media has been the format of choice for the music industry for the past twenty years.

Some of the commonly used optical-media formats presently include read-only formats such as CD-DA (digital audio compact disc), CD-ROM (CD-read-only memory), DVD (digital versatile disc or digital video disc) media, write-once read-many times (WORM) formats such as CD-R (CD-recordable), DVD-R/DVD+R (DVD-recordable). Some of the commonly used rewritable formats include magneto-optical (MO) discs, CD-RW (CD-rewriteable), DVDRAM (DVD-Random Access Media), DVD-RW, DVD+RW (DVD-re-recordable), phase-change optical discs, and the like.

Advantages to optical storage media, such as CDs and DVD includes the large data storage capacity as well as low manufacturing costs of such media. Disadvantages to optical storage media, however includes that data stored on the optical media can be easily "mirrored" onto non-original CDs or DVDs.

To attempt to address such disadvantages, many techniques have previously been tried to reduce non-original optical media having mirrored data and/or use of the data stored on original optical media. However, even commercially available solutions have proven to be vulnerable. As an example, in one scheme, almost all data is transferred from an original optical media (e.g. CD, DVD) to a computer hard drive. However, unless the original distribution media is not in the optical drive, the application will not run properly.

One simple technique used to bypass such a scheme has been via application patching and CD device emulation. As a result of this technique, the program executes properly, or is fully operational, even though the original distribution media is not present.

Another simple technique to bypass such a scheme has been to use a "raw" mode of writing, a feature present in many optical drives (e.g. CD recorders). With this mode, exact bit-for-bit reads from an original optical media and writes to another optical media can be made. The only limitation with this mode of writing is that the device must perform it in accordance with standard CD recording procedure, which strictly defines a size of blocks and margins of the data layout.

Accordingly, what is desired are methods and apparatus for reducing mirroring of data stored on original optical media, with reduced number of drawbacks described above.

BRIEF SUMMARY OF THE INVENTION

The present invention relates to computer-readable media, such as computer disks. More specifically, the present invention relates to methods and apparatus for reducing use of data stored on non-original media. In various embodiments, use of data includes reproduction of such data, execution of programs represented by such data, and the like.

Embodiments of the present invention are directed to hinder mirroring of data stored on original computer-readable media, such as magnetic media, semiconductor media, optical-readable media, and the like onto non-original computer-readable media. In various embodiments, techniques are introduced during the production and recording of the media which makes at least a portion of the data stored on original media unusable when transferred to unoriginal media. In other embodiments, all data stored on an unoriginal media may be unusable.

As will be explained further below, the inventors of the present invention have recognized that various computer-readable media, such as optical media, specify the storage of technical data in technical zones as well as the application data in application data zones, (also user regions, user zones). Current optical recording devices have the ability to perform hardware-level writes to the technical zones of the storage medium. In the case of CDs, such technical data includes a lead-in, absolute time in pre-groove, lead-out areas of a CD, and the like. The inventors have recognized that these technical zones cannot be mirrored via standard procedures and, therefore, may be unique for every CD. Technical zones are also referred to here in as non-mirrorable zones, or regions.

In accordance with various embodiments of the present invention, special data is placed in the user data area of the medium at logical addresses that are stored in technical zone of the medium. More specifically, in various embodiment, pointers or references to the locations of the special data are stored in an area of the medium that is not ordinarily or easily mirrored onto non-original media. Further, a non-original medium lacking these pointers will thus not be usable.

Various embodiments of the present invention utilize a multilayer approach to inhibiting use of data copied from an original disk on a non-original disk. In a first level, various embodiments profile the medium to which the original master is written and ensures that the medium (e.g., a disc) used when running the application matches this profile. In a second level, various embodiments of the present invention use detection techniques to inhibit skilled programmers from trying to step through the code embodying the present invention using, for example, a debugging tool. In a third level various embodiments of the present invention make changes to the CD content itself to hide specific data from skilled programmers and programs designed to mirror an original disk, as discussed above. These approaches complement one another in combinations of the various embodiments, but it should be understood that these approaches may also used individually. For example, embodiments of the herein described invention may be used by itself or in combination with these different approaches.

According to one aspect of the invention, a method of inhibiting use of data mirrored from an original medium on an un-original medium is described. A medium typically includes a data zone and, a technical zone which specifies at least one data location in the data zone. The technical zone is commonly not mirrorable. During operation of a medium, data stored at data locations specified in the technical zone are accessed. If "valid" data is found at the stored location, use of data stored in the data zone is allowed, however if "invalid" data is found, use of data stored in the data zone is inhibited.

In some embodiments, when "valid" data is found in the non-mirrorable segment(s) (technical zone), that data is analyzed to determine whether the media is original or not original. Once again, if the media is not original, use of material stored on the recordable medium is inhibited. In various embodiments, the user-zone data may include, for example, a specific "valid" code and/or data necessary for accessing material stored on the recordable medium. In some embodiments, the non-mirrorable segment(s) may be provided the lead-in area of a CD, for example.

In other embodiments, an analysis may include searching for a match between data stored within the data zone and data stored in the non-mirrorable segment(s) (technical zone). Additionally, such data may be descrambled. As an example, various methods may include attempting to descrambled data in the data zone (user zone) by using unscrambling data stored or referred-to in the non-mirrorable segment(s) (technical zone). Use of the material stored on the recordable medium is inhibited if descrambling is unsuccessful, if subsequent analysis (following unscrambling) is unsuccessful at verifying that the media is original, or the like.

In some embodiments, the medium comprises a stored pedigree specifying physical characteristics thereof. During operation of the recordable medium, the pedigree is read and compared with sensed physical characteristics of the medium, and if the pedigree fails to match the sensed physical characteristics, use of material stored on the recordable medium is inhibited.

In some embodiments, the recordable medium contains machine-readable instructions for determining if the medium is original, and use of material stored on the recordable medium is inhibited if improper access to the machine-readable instructions is detected.

In another aspect of the present invention a recordable medium includes a user zone subject that may be mirrored, and a technical zone not subject to conventional mirroring. In various embodiments, data stored in the technical zone specify at least one location in the user zone. Further, data stored in the specified user-zone location(s) is typically accessible only by determining the stored data in the technical zone. For example, data stored in the specified technical zone location(s) may be necessary to access data stored on the recordable medium, or may be an pre-determined code. In another aspect of the present invention, a recordable medium that includes stored pedigree data specifying externally readable physical characteristics of the medium, and specific identified data stored in a non-mirrorable segment are described.

For ease of explanation, the operation of various embodiments of the present invention are discussed with respect to compact disk (CD) embodiments. However, it should be understood that various embodiments are applicable towards other types of optical media, such as DVDs, or the like, as well as non-optical media, such as magnetic media, semiconductor media, organic media, or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 1 illustrates typical data stored on a CD;

DETAILED DESCRIPTION OF THE INVENTION

The following definitions are provided to define various terms used:

ATIP: Absolute time in pre-groove.

Absolute MIS/F Field: See "MSF Address."

Audio Sector: See "Sector."

Block: The term "Block" refers to data sent to/from the medium. The Block is data addressed by a Logical Block Address (LBA).

CD-DA: Compact Disc-Digital Audio (CD-DA) is a standardized medium for recording digital/audio information. The "Red Book" defines CD-DA media. See IEC 908:1987.

CD-R: Compact Disc-Recordable (CD-R) is a standardized medium defined by the "Orange Book" Part 2. The CD-R system allows information to be written once and read many times. A recorded CD-R disc may be Red Book-compatible, so it can be played back on any conventional CD player. The CD-R format allows both audio and data recording.

CD-RW: Compact Disc-Rewritable (CD-RW) is a standardized medium defined by the "Orange Book" Part 3. The CD-RW system allows the user to write, erase, overwrite and read CD information. The recorded CD-RW disc has a lower reflectivity than a "Red Book-compatible" disc, so it must be played back on CD-RW enabled (Multi-Read) CD players. The CD-RW-enabled CD player can therefore read CD-RW discs as well as CD-R and conventional CD discs. The CD-RW format allows both audio and data recording.

CD-R/RW: Either a CD-R or CD-RW medium.

CD-ROM: Compact Disc-Read Only Memory (CD-ROM) is a standardized medium for recording digitized audio and digital data. CD-ROM is used to describe media with digital data rather than discs that encode audio only. The ISO/IEC 10149 standard defines CD-ROM media.

CD Data Mode: A byte in the header of CD data sectors. This indicates whether data is present and, if so, the format of the data.

CD Media: Term that is used when referring to media that conform to the CD standards set forth in one or more of the following documents:

Red Book, CD-DA;

Yellow Book, (ISO/IEC 10149) CD-ROM;

Orange book part 2, CD-Recordable and part 3 CD-Rewritable;

White book, CD-Video;

Green Book, CD Interactive, CD-I;

CD-ROM XA•Enhanced Music CD Extra; and

Multi-session CD.

Data Area: The area between the Lead-in area and the Lead-out area in which user data is recorded.

Disc: A medium that adheres to one of the CD or DVD standards.

Disc-at-once recording: A method in which Lead-in, user data and Lead-out areas are recorded sequentially without interruption, and no pointer to a next possible session exists.

Format: The arrangement or layout of information on CD media.

Frame: A sector on CD media. Also the F field unit of a MSF CD address. The smallest addressable Unit in the main channel.

LBA (Logical Block Address): The LBA defines a mapping mode to a linear address space.

Lead-in Area: The CD Lead-in area is the area on a CD disc preceding the first track. The area contains the TOC data and precedes each program area. The main channel in the Lead-in area contains audio or data null information. This area is coded as track zero but is not directly addressable via the Command set. The Q sub-channel in this area is coded with the Table of Contents information.

Lead-out Area: The CD Lead-out area is the area on a CD disc beyond the last information track. The main channel in the Lead-out area contains audio or data null information. This area is coded as track AAbcd but is not directly addressable via the Command set.

L-EC: Layered Error Correction (L-EC) is an error correction technique used with CD-ROM sectors.

Logical Block: See "Block."

MSF Address: The physical (MSF, i.e., Minute/Second/Frame) address, expressed as a sector count relative to either the beginning of the medium (i.e., an absolute address) or to the beginning of the current track (i.e., a relative address). As defined by the CD standards, each F field unit is one sector, each S field unit is 75 F field units, each M field unit is 60 S field units. Valid contents of F fields are binary values from 0 through 74. Valid contents of S fields are binary values from 0 through 59. Valid contents of M fields are bcd values from 0 through 79 in the user data area.

PCA (Power Calibration Area): Area used for Optimum Power Calibration. This area ends at the start of the RMA or PMA. In general, the PCA may be used a limited number of times, depending on the drive.

PMA (Program Memory Area): PMA is the area for temporary storage of Table of Contents entries. This area starts immediately after the PCA and it ends at the start of the Lead-in.

RMA (Recording Management Area): RMA is the area for recording RMD. This area starts immediately after the PCA and it ends at the start of the Lead-in.

RMD (Recording Management Data): The data to be stored in the RMA.

Session: A contiguous area of a Disc that contains a lead-in, a Program Area (PA), and a lead-out.

Sub-channel: CD media have a main channel and a sub-channel. The sub-channel area has eight parts (P, Q, R, S, T, U, V, and W). The Q sub-channel contains information useful to the controller of a device reader, e.g., the control file and MSF addresses.

TOC: Table of Contents. The table of contents has information on the type of disc and the starting address of the tracks. This information is encoded in the Q sub-channel, in the Lead-in area of the CD.

User Data: The data that is normally transferred across the logical unit interface by and for read and write commands.

2. CD media organization

Figure 2:
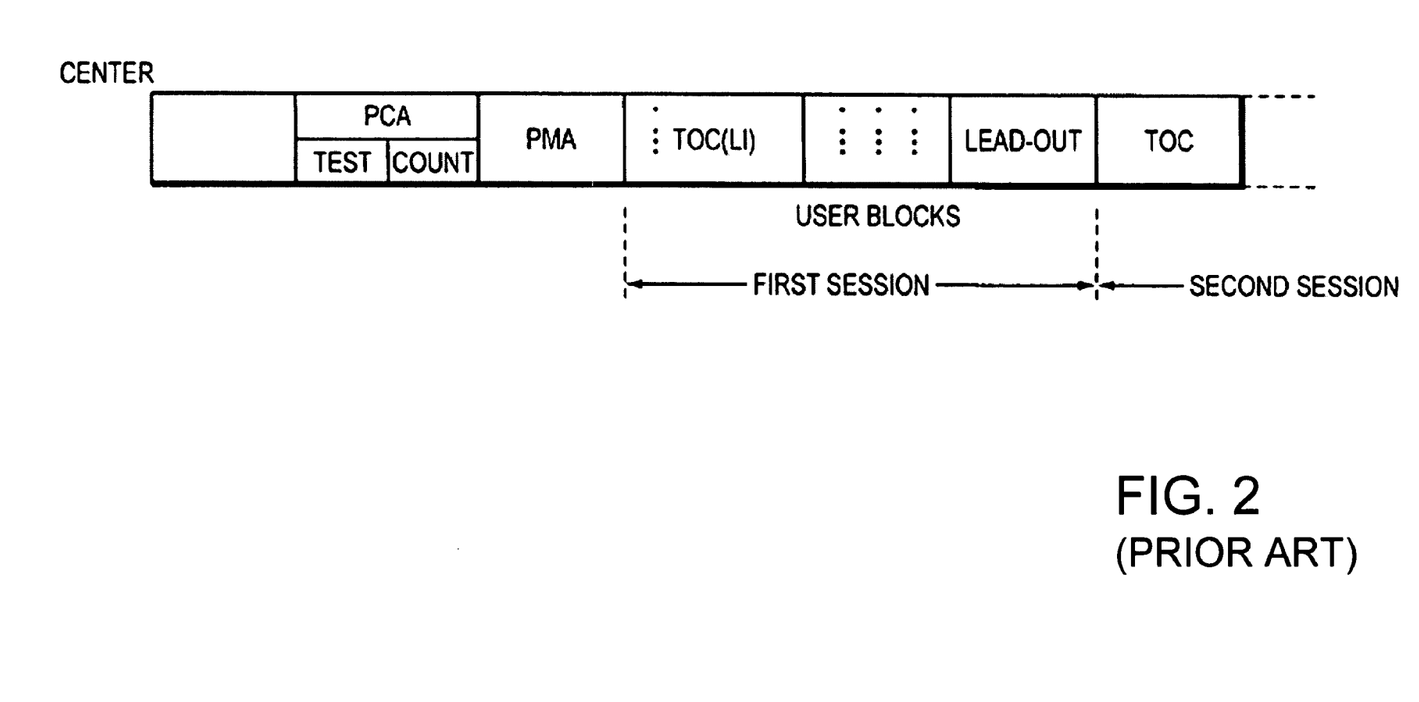
FIG. 2 illustrates a logical layout of a conventional CD-R/RW disc.

The formats written on the CD-ROM and CD-DA media involve interfacing considerations. Discs may contain audio, data or a mixture of the two. FIG. 1 illustrates typical data stored on a CD. More specifically, the table in FIG. 1 illustrates an audio-combined disc showing the relationship between the logical block addresses reported and the MSF address encoded on the medium. FIG. 2 illustrates the layout of a typical CD-R/RW medium.

The term "Frame" is used in two different ways in the CD media standards. The intended meaning is determined from the context. Whenever possible, the ensuing description replaces the larger data unit with the more familiar term "sector." The primary exception to this policy is the use of the term "frame" when referring to the MSF address. In the MSF context, one frame equals one sector. On a typical two-channel CD-DA medium, each frame is played in 1/75th of a second.

In accordance with conventional practice, the size of a CD logical sector is 2048, 2052, 2056, 2324, 2332, 2336, 2340 or 2352 bytes per sector. These values correspond to the user data plus various configurations of header, subheader and EDC/ECC. This same area of the CD-ROM or CD audio medium may store 1/75th of a second of two-channel audio information formatted according to the CD-DA specification. (These audio channels are usually the left and right stereo components.) An audio-only density code value can be used to declare an area of the medium to be invalid for data operations. With reference to FIG. 2, the physical format defined by the CD-ROM media standards provides 2352 bytes per sector. For typical computer data applications, 2048 bytes are allocated to user data, 12 bytes to a synchronization field, 4 bytes to a sector address tag field, and 288 bytes—the auxiliary field—for L-EC (CD-ROM data mode 1). In less critical applications, the auxiliary field may also be used for user data (e.g., CD-ROM data Mode 2 1 Form 2).

For data and mixed-mode media (those conforming to ISO/IEC 10149), the logical block address Zero is assigned to the block at MSF address 00/02/00. For audio media (those conforming only to IEC 908), the logical block address Zero is assigned to the actual starting address of Track 1. This may be approximated by using the starting address of Track 1 contained in the Table of Contents (TOC) or by assigning logical block address Zero to the block at MSF address 00/02/00.

A Track may be viewed as a partition of the CD address space. The CD medium contains from one to ninety-nine Tracks. All information sectors of a Track are required to be of the same type (audio or data) and mode. Each change in the type of information on the disc requires a change in Track number. A disc containing both audio and data has at least two Tracks, one for audio and one for data. The Tracks of a CD media are numbered consecutively with values between 1 and 99, although the first information Track may have a number greater than 1. Tracks have a minimum length of 300 sectors including any transition area that is part of a Track.

The CD media standards require transition areas between Tracks encoded with different types of information. In addition, transition areas may be used at the beginning or end of any Track. For audio Tracks the transition areas are called pause areas. For data Tracks, transition areas are called pre-gap and post-gap areas (see Table 1). The IEC 908 and ISO/IEC 10149 standards specify minimum time durations for these areas. Maximum time durations are not specified.

3. Recording on CD Media

Data may be recorded on CD media in any of several ways, e.g., Session At Once, Track At Once, and Packet Writing. A special case of Session-At-Once recording is known as Disc At Once. In Disc-at-Once mode, the entire CD including the lead-in and lead-out is written at once, without the write laser being switched off. Similarly, in Session-at-Once mode, all data (lead-in, data area and lead-out) is written at once, but the CD is not "finished." That is, after a Session-at-Once recording it is still possible to write a further "Session" on the CD at a later date. In Track-at-Once mode, by contrast, the writing laser is switched off after every Track. When recording the next Track, the laser is recalibrated and a new recording is initialized. The CD's table of contents is not written until the last Track has been recorded.

Packet Writing is a method of writing data on a CD in small increments, and can be further classified into Variable Packet Writing and Fixed Packet Writing. Fixed-length packets are more suitable for CD-RW in order to support random erase. Variable-length packets save space because the size of the packet can vary with the data being written.

4. Organization

Figure 3:
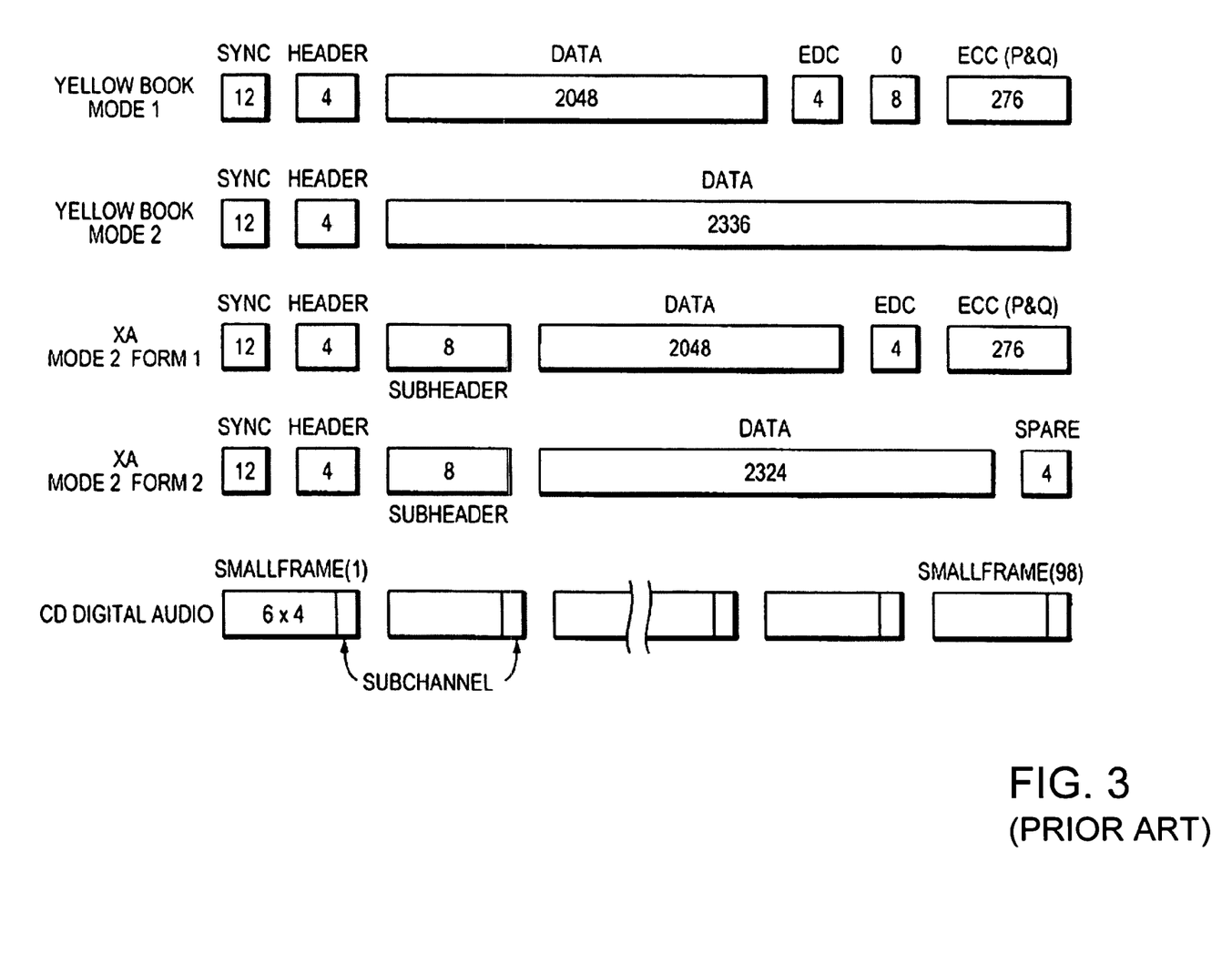
FIG. 3 illustrates a logical sector format of a conventional CD-ROM.

FIG. 3 illustrates a block diagram of an embodiment of the present invention. More specifically, a system 300 is illustrated.

In various embodiments, system 300 may be a conventional computer including conventional components. Various components are omitted from FIG. 3 for ease of presentation. Typically the user interacts with system 300 by means of input/output (I/O) devices 310, including, a keyboard, a user input device such as a mouse. System 300 also includes an operating system 315, which performs basic tasks such as receiving input from I/O devices 310, sending output to a display, keeping track of files and directories on various storage devices, controlling peripherals, and the like.

Relevant to various embodiments is the operating system's responsiveness to commands issued by application programs or I/O devices 310 for access of data stored in volatile and non-volatile memory, including storage media. As discussed above, CDs 325 represent one example of a storage medium. CDs 325 are typically accessed by an optical drive 320, such as a CD or DVD drive. In various embodiments, optical drive 320 includes an internal control program 330 implementing portions of various embodiments of the present invention as described below. Internal control program 330 is typically termed "firmware."

System 300 also includes a confirmation module 340, implemented as a process on system 300. In various embodiments, a request from a software application or from a user, such as a request for access to the contents of CD 325 in optical drive 320 is made. In response, operating system 315 passes the request to confirmation module 340. Confirmation module 340 then processes the request, as will be described in greater detail below. If confirmation module 340 determines that CD 325 is an original CD, confirmation module 340 responds to operating system 315 positively, and operating system 315 interacts with CD 325 in a conventional manner. However, if confirmation module CD 340 determines that CD 325 is not an original CD, confirmation module 340 responds to operating system 315 negatively. In response, operating system 315 may not properly access data stored on CD 325, execute the application properly, provide full-functionality to the application, or the like.

5. Media Profiling

In some embodiments of the present invention creates, a profile of the medium to which the original master is written. In such embodiments, physical characteristics of the medium are recorded directly on the medium as a pedigree for comparison with characteristics actually sensed or read during use. The characteristics may relate to the medium as well as the application encoded thereon. If the sensed characteristics differ from those recorded on the medium, the medium is non-original and access to such data is denied, restricted, crippled, or the like. This approach is believed to inhibit more common form of mirroring of an original disk, to a non-original disk such as, from CD-ROM originals to CD-Rs.

In various embodiments, data CDs often have physical properties that may be used as a pedigree to determine the originality of the media. In accordance with various embodiments of the present invention, a media profile is a set of values uniquely defined for each medium at the pre-mastering and mastering phase. The following media properties may be included in a profile:

1. Media type (e.g., in accordance with Philips Rainbow-Books media types);
2. Number of sessions;
3. TOC information;
4. ATIP B0 point information;
5. ATIP C0 point information; and
6. Negative LBA zone data.

During the pre-mastering phase, a CD manufacturing process in accordance with various embodiments of the present invention accesses the medium, collects necessary data, fills the corresponding media profile elements and stores the profile data in a dynamically generated, encoded library. This library, unique for each medium, is directly stored on (i.e., written to) the medium itself.

6. Detection Routines

In some embodiments, confirmation module 340 implements known detection techniques to prevent programmers from easily examining and getting around the machine code, for example, via a debugging tool. In various embodiments, these routines are triggered when a user or application first attempts to access the CD 325. Suitable detection techniques may be based on synchronized timing events that lead users to irrelevant parts of the code when debuggers disrupt the timing. This prevents skilled programmers from reaching the parts of the code that implement, for example, the profiling and not readily accessible data portions disclosed in various embodiments of the present invention. These techniques are believed to be difficult to get around.

In some embodiments, the detection technique utilizes a cross-thread timing-event synchronization approach. In such embodiments, confirmation module 340 may be called each time the medium is accessed. In response, confirmation module 340 may cause a pseudo-random number of threads to be created in order to confuse the user. In such cases, the user must first decide which of these threads to follow, although most lead nowhere. However, even if the user follows the correct thread, each thread starts a timer when it is created and stops the timer when it exits. If the elapsed time varies too greatly from a set tolerance level—as it would if someone were stepping through the code with a debugger—the thread reports an error and various embodiments of the present invention aborts execution.

Confirmation module 340 may also check for the presence of debugging processes (e.g., via the Microsoft Windows API) and CPU flags responsive to the CPU step-by-step execution mode. Again, if debugging processes are detected, in various embodiments, confirmation module 340 causes execution to be halted and access to the medium to be denied, or the like.

7. Not Readily Accessible Data

Special data is placed in the user data area at logical addresses that are stored in a zone of the medium that is not ordinarily or easily mirrorable, e.g., the technical zone. The special data typically includes pointers to one or more locations in the data zones. These pointers are generally non-mirrorable but generally required for access to the medium's content, i.e. data. As used herein, the term "non-mirrorable" refers to a segment or segments that are not ordinarily mirrored and/or are not easily mirrored, when making a copy of a medium. "Non-mirrorable" does not typically mean that such data is absolutely impervious to being mirrored.

Figure 5:
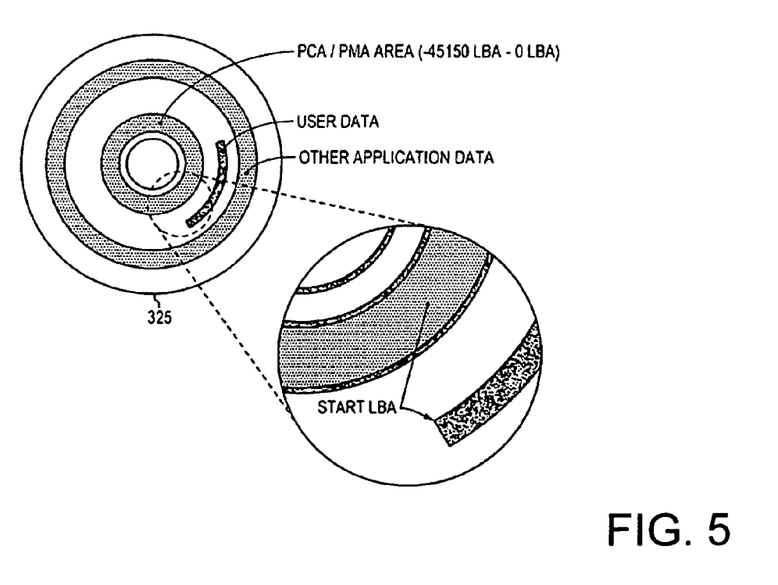
FIG. 5 illustrates a logical layout of an embodiment of the present invention.

FIG. 5 illustrates one embodiment of the present invention. In such embodiments, a logical addresses of the special information in the data zone is stored in the lead-in area (i.e., in negative LBAs) of CD 325.

In various embodiments, optical drive 320 is typically configured, by means of control program 330, to recognize these pointers and to fetch the special data pointed to in the data zone. The special data may be any imaginable data, and the nature and the function of the special data may be determined by a CD publisher. As an example, the special data may be a portion (e.g., a library, subroutine, etc.) of the user program (e.g., a software program, data, music, etc.) stored on the CD 325, and without which the user program will not operate. In such an example, when the special data is fetched, it is properly integrated within the user program by control program 330 and/or by the stored user program itself. In such embodiments, the optical drive's internal set of input/output subroutines (firmware) may be configured not only to fetch the special data but also to properly integrate it into the program. In another embodiment, the portion of the user program may be fetched by optical drive 320 and made available to the user program, which performs the integration.

Optical drive 320 may be configured directly, i.e., manufactured with installed firmware that locates the pointers in the lead-in area and causes retrieval of the special data. Alternatively, optical drive 320 may be a standard unit, in which case the controller commands causing the drive 320 to locate and obtain the special data are supplied by the stored user program as it launches; that is, software on CD 325 itself controls drive 320 in accordance with various embodiments of the present invention. This software may be part of the user data, since its availability to the user does not defeat the operation of various embodiments of the present invention: if the reader does not find location data on the CD lead-in area, the user program will not operate.

The special data may alternatively (or in addition) be a code or sequence of codes. For example, the special data may contain publisher identification information, a date of manufacture, a serial number, and a unique 128-bit digital ID. The CD publisher is free to decide how to use this information to identify non-original media. In one approach, the user program comprises computer instructions which, when executed, search for a match between data uniquely stored within the user program itself and that retrieved from the lead-in area. To prevent spoof-type operations, the data in the user area may be scrambled using the digitallD stored in the lead-in area, thereby allowing conventional descrambling functionality included within the user program to descrambling the data in the user area using the same digitallD. The descrambled code may, for example, correspond to the serial number of the CD. If the descrambling fails, the CD is not-original. In various embodiments, even if the descrambling succeeds, the CD will be identified as not-original unless the result matches the unique serial number associated with the original CD. This allows all CDs to receive the same digitallD for descrambling purposes, since even if this code is known by an improper user it will be insufficient to cause the CD to run properly.

In still other embodiments, the data in the data zone may be a password, a descrambling key, a checksum, a proper set of parameters for the application program, and the like. In other embodiments, almost any other type of data imaginable may be stored in the specified data zone pointed-to by the special data.

7.1 Data Preparation

A CD manufacturing process in accordance with various embodiments of the present invention begins by assigning the address range that the user program needs in order to operate properly. After this is accomplished, data-size estimation is carried out. The resulting data size is then converted to CD logical block range.

In some embodiments, based on the size of the user data portion, the start and end LBA on the CD are calculated and the non-transferable block of data is prepared. That block of data contains the addressing information for the special data. The special data is desirably placed on the CD at random positions (above LBA=0). Moreover, the end LBA should not exceed the current session lead-out LBA and, if the CD is to be recorded as single session, should not overlap the ordinary data start LBA.

7.2 CD Mastering

Figure 4:
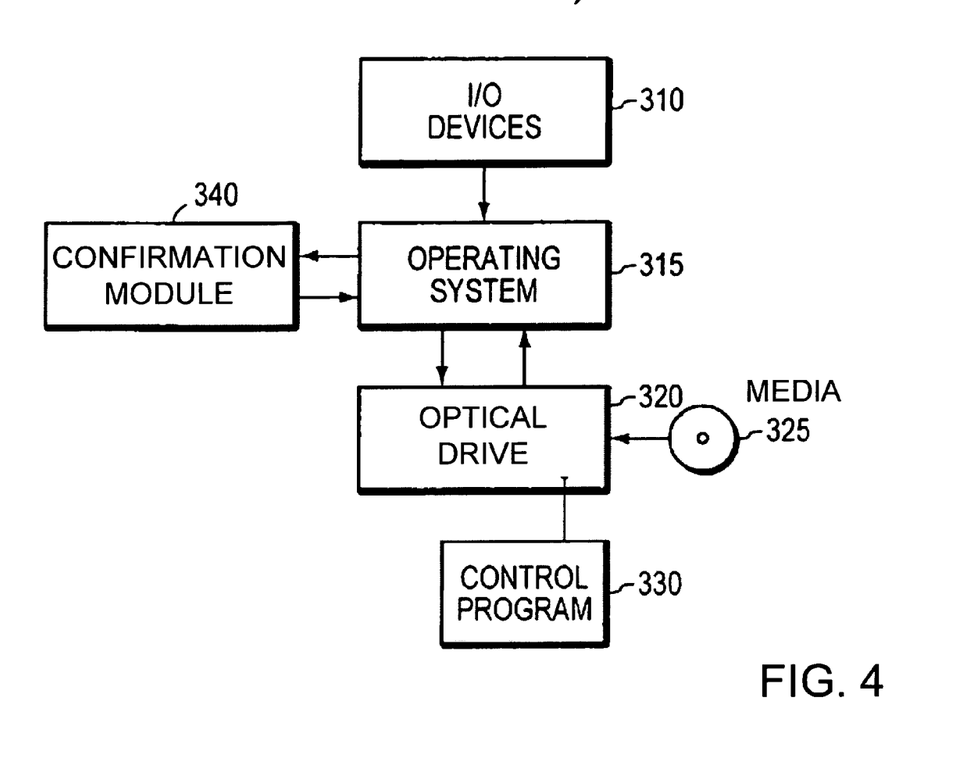
FIG. 4 illustrates a block diagram of an embodiment of the present invention.

The CD with use restrictions can be recorded in Yellow Book DATA MODE 1 (see FIG. 2) with 2048 block size, and can be in the Session-At-Once mode. The non-transferable data is desirably recorded in the lead-in PCA/PMA areas with a random-start LBA (see FIG. 4). In various embodiments, the start address can vary between −45150 to 0 excluding the address space between −1000 and −120. No sub-channel information modification occurs during the recording. The start LBA of the non-transferable data is typically stored separately.

After the non-transferable portion of data is written, the user data is recorded. The assigned portion of user data can be recorded either in a separate session or in the same session as other data. The lower LBA for storing the user data is greater than 0.

7.3 Accessing Restricted Data

Figure 6:
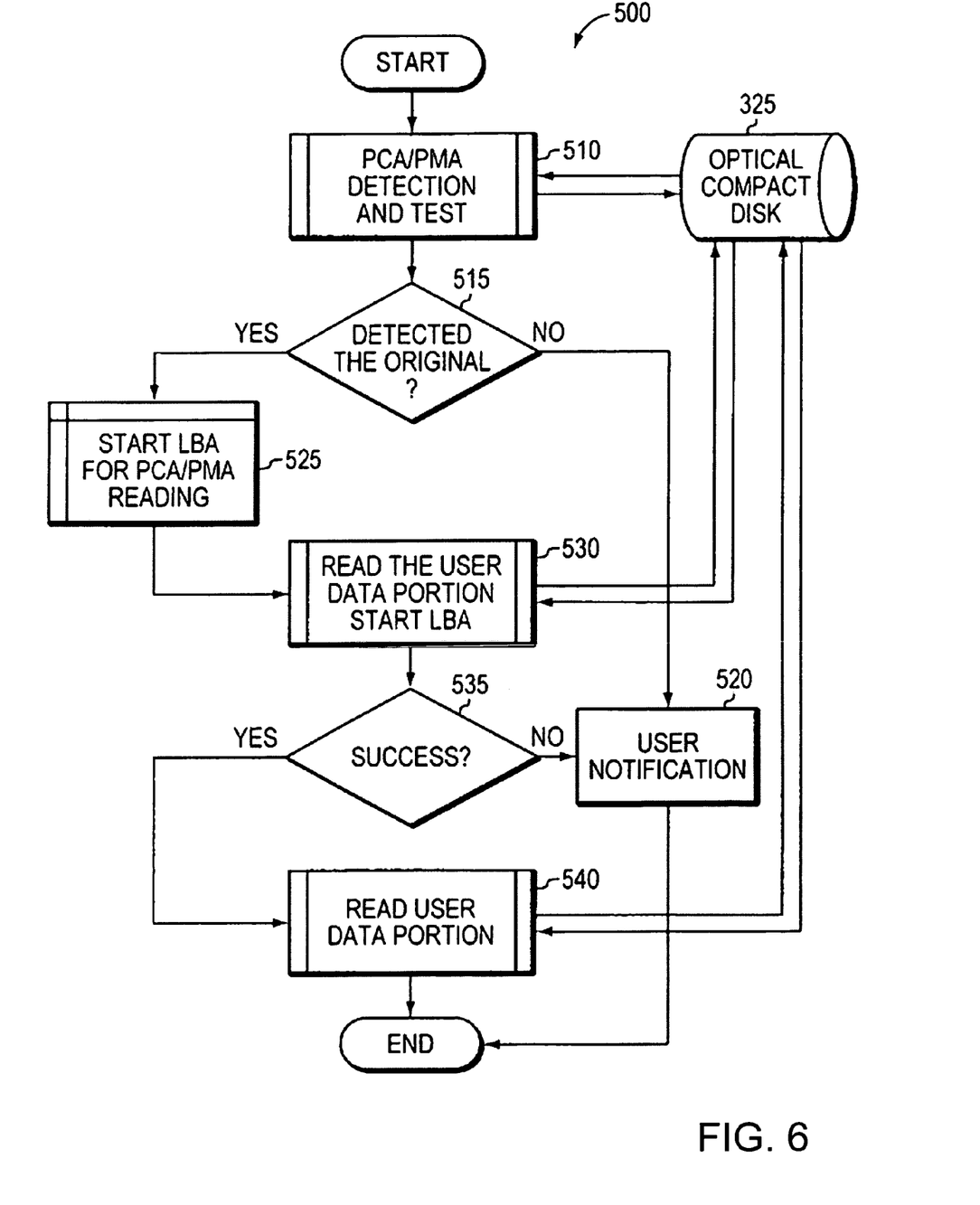
FIG. 6 illustrates a flow diagram according to embodiments of the present invention.

As illustrated in FIG. 6, one embodiment of a process 500 for accessing user-restricted data involves several steps. First, the originality of the CD is determined. In various embodiments, during this procedure the software scanning system for the optical drive detects the presence of the CD disc inserted in the device. After the CD is detected, the software analyzes the content of PCA/PMA areas (step 510).

Next, the stored non-transferable data start LBA is used as a start address for reading the block of data. This typically includes information conforming to a format that can be easily identified. In step 515, if the identification shows that the data matches the format, the detection is assumed to be successful, and analysis continues. In some embodiments, in case of a negative result, the user is notified that the CD is not valid or corrupted (step 520). In some embodiments, if the optical driver is not able to read PCA/PMA areas, the user is warned that his device is not compliant with the standard and, therefore, cannot read the CD.

Upon successful detection, the LBA values corresponding (i.e., pointing) to the location of the special data on the user area are read (step 525). Data blocks at these pointed-to locations are read and utilized in various ways described above (step 30). If, upon processing of these blocks (which may include descrambling), if successful (step 535), access is accorded to the full user area (step 540).

In various embodiments, if unsuccessful, the user is warned that the medium is not valid (step 520) and access is denied. In other embodiments, alternative operations may be performed, such as allowing a set number of uses of a program before the program does not run, or the media (e.g. audio/video) becomes unaccessible or the disk becomes unaccessible; allowing 20 minutes of operation before halting; allowing only a sub set of operations of the program to be run; allowing only select sub-set of the media to be playedback; invoking a shareware or demonstration version of the application; providing unpredictable playback of audio or video content; providing reduced-quality audio or video playback; inviting the user to purchase a licensed copy of the software or media; opening one or more web pages; causing data to be written to the non-original disk; making the user data unaccessible from the data zone; automatically reporting attempted use of a non-original disk to a specified web server, possibly in combination with one of the functions described above; and the like.

Embodiments of the present invention may be applied to any number of media, for example, optical media such as CDs, DVDs, and the like; magnetic media, such as hard disks, storage area networks, and the like; semiconductor media, such as flash memory (Compact flash, secure digital, memory stick, and the like); and the like.

Further embodiments can be envisioned to one of ordinary skill in the art after reading this disclosure. In other embodiments, combinations or sub-combinations of the above disclosed invention can be advantageously made. The specification, accordingly, is to be regarded in an illustrative rather than a restrictive sense. It will, however, be evident that various modifications and changes may be made thereunto without departing from the broader spirit and scope of the invention as set forth in the claims.

What is claimed is:

1. A tangible computer readable medium comprises:
   a first region storing technical data regarding the computer readable medium, and storing at least one reference to a specified positive logical address on the computer readable medium, wherein the technical data and the one reference are stored at negative logical addresses on the computer readable medium; and
   a second region storing user data, and storing additional user data, wherein the user data and the additional user data are addressed by positive logical addresses on the computer readable medium, and wherein the additional user data is addressed by the specified positive logical address.

2. The tangible computer readable medium of claim 1 wherein the computer readable medium is selected from a group consisting of: CD-ROM, CD-R, DVD-ROM, DVD-R, DVD+R, optical recording media.

3. The tangible computer readable medium of claim 1 wherein the user data comprises data selected from a group consisting of: executable programs, program data, audio data, image data, video data, moving image data, audio-visual data.

4. The tangible computer readable medium of claim 3 wherein the first region also stores data selected from a group consisting of: power calibration area data, table of contents data, logical block address data.

5. The tangible computer readable medium of claim 3
   wherein the user data comprises an executable program; and
   wherein the executable program is not fully operative unless the additional user data is retrieved.

6. A method for a computer system comprises:
   receiving a storage media in a device configured to access data from the storage media;
   receiving a first set of data from a first memory region of the storage media, wherein the first set of data comprises data regarding a storage format of the storage media, and at least one data reference;
   receiving a second set of data from a second memory region of the storage media in response to the one data reference;
   determining whether data from the second set of data matches predetermined data;
   when the data from the second set of data matches the predetermined data, accessing a third set of data from a second memory region of the storage media in response to at least some data from the first set of data, wherein the third set of data comprises user data; and
   when the data from the second set of data does not match the predetermined data, the method further comprises restricting computer system access to the third set of data.

7. The method of claim 6 wherein the second memory region are located at non-negative logical regions on the storage media.

8. The method of claim 7 wherein the second set of data is selected from a group of data consisting of: a password, a checksum of the data determined in response to the data regarding the storage format of the storage media, an encryption key.

9. The method of claim 8 wherein third set of data comprises data selected from a group consisting of: executable programs, program data, audio data, image data, video data, moving image data, audio-visual data, text.

10. The method of claim 6 wherein when the data from the second set of data does not match the predetermined data, indicating an error condition.

11. The method of claim 6 wherein restricting computer system access to the third set of data comprises outputting an indication that the storage media is inaccessible.

12. The method of claim 6 wherein restricting computer system access to the third set of data comprises providing the computer system with time-limited access to the third set of data.

13. A method for recording data onto a tangible media comprises:
   recording user data in a first region of the tangible media;
   recording authentication data in the first region of the tangible media at a memory address;
   recording header data in a second region of the tangible media;
   recording the memory address in the second region of the tangible media; and
   wherein the tangible media is removable from the computer system;
   wherein the tangible media comprises a plurality of negative logical block locations, and a plurality of non-negative logical block locations;
   wherein data stored in the first region are stored in negative logical block locations; and
   wherein data stored in the second region are stored in non-negative logical block locations.

14. The method of claim 13 wherein the user data comprises data selected from a group consisting of: executable programs, program data, audio data, image data, video data, moving image data, audio-visual data, text, binary data.

15. The method of claim 14 wherein the tangible media is selected from a group consisting of: CD-ROM, CD-R, DVD-ROM, DVD-R, DVD+R, optical recording media, organic media.

16. The method of claim 13
   wherein the user data comprise at least one application program;
   wherein the one application program is configured to determine whether the authentication data is stored at the memory address.

17. The method of claim 13
   wherein the user data comprise a first application program, and portions of a second application program;
   wherein the authentication data comprises additional portions of the second application program;
   wherein the first application program is configured to combine the portions of the second application program and the additional portions of the second application program to form the second application program.

* * * * *